United States Patent [19]

Minchak

[11] 4,002,815

[45] Jan. 11, 1977

[54] CYCLOPENTENE-DICYCLOPENTADIENE COPOLYMERS AND METHOD OF MAKING SAME

[75] Inventor: Robert J. Minchak, Parma Heights, Ohio

[73] Assignee: The B. F. Goodrich Company, Akron, Ohio

[22] Filed: Apr. 3, 1975

[21] Appl. No.: 564,774

Related U.S. Application Data

[63] Continuation-in-part of Ser. No. 412,956, Nov. 5, 1973, which is a continuation-in-part of Ser. No. 337,392, March 2, 1973, Pat. No. 3,853,830.

[52] U.S. Cl. .............................. 526/283; 526/169; 526/185; 526/308; 526/916
[51] Int. Cl.² .............. C08F 210/00; C08F 212/00
[58] Field of Search .................. 260/80.78, 93.1; 526/185, 283, 308, 916, 169

[56] References Cited

UNITED STATES PATENTS

| 3,074,918 | 1/1963 | Eleuterio ........................ 260/93.1 |
| 3,684,781 | 8/1972 | Nutzel et al. .................. 260/80.78 |
| 3,687,921 | 8/1972 | Oberkirch et al. ........... 260/88.2 R |
| 3,778,420 | 12/1973 | Brown et al. .................... 260/80.7 |
| 3,790,543 | 2/1974 | Lehnert et al. ................. 260/93.1 |
| 3,790,545 | 2/1974 | Minchak ........................ 260/93.1 |
| 3,853,830 | 12/1974 | Minchak ........................ 260/88.2 |

OTHER PUBLICATIONS

Truett et al., J. Amer. Chem. Soc., 1960, 82, 2337–2340.
Rinehart in "Polymer Chemistry of Synthetic Elastomers", Part II (Interscience, New York, 1969) pp. 880–882.

Primary Examiner—Joseph L. Schofer
Assistant Examiner—A. L. Clingman
Attorney, Agent, or Firm—J. Hughes Powell, Jr.; C. A. Crehore

[57] ABSTRACT

Substantially gel-free copolymers of cyclopentene with dicyclopentadiene are prepared by polymerizing these monomers in the presence of (1) a catalyst comprising (a) at least one compound selected from the group consisting of dialkylaluminum iodides, alkylaluminum diiodides and mixtures of trialkylaluminum compounds with elemental iodine and (b) at least one solvent- or monomer-soluble tungsten compound, and (2) at least one nonconjugated acyclic olefin having at least one hydrogen on each double-bonded carbon atom. Catalyst component (a) is charged before catalyst component (b).

4 Claims, No Drawings

CYCLOPENTENE-DICYCLOPENTADIENE COPOLYMERS AND METHOD OF MAKING SAME

CROSS REFERENCE TO RELATED APPLICATION

This is a continuation-in-part of my copending U.S. application Ser. No. 412,956 filed Nov. 5, 1973, which in turn is a continuation-in-part of my U.S. application Ser. No. 337,392 filed Mar. 2, 1973, now U.S. Pat. No. 3,853,830.

BACKGROUND OF THE INVENTION

Cycloolefins can be polymerized through the olefin structure to yield polycycloaliphatics, or through a ring opening process to yield unsaturated linear polymers. The latter process has particular appeal, since the polymers so made are sulfur-vulcanizable. Since cyclopentene is a readily available ethylene production by-product, much of the art focuses on the ring-opening polymerization and copolymerization of cyclopentene.

U.S. Pat. No. 3,790,545 teaches ring-opening, polymerization of cyclopentene at a temperature from about −40° C to about −60° C and lower with a catalyst comprising a tungsten salt, an organoaluminum compound and, optionally, an acyclic olefin molecular weight modifier. The tungsten salt is added after the organoaluminum compound and at polymerization temperatures. The general application of broad prior art teachings such as that of U.S. Pat. No. 3,790,545 to the copolymerization of cyclopentene with dicyclopentadiene results in no reaction occurring, or if a reaction occurs, the polymer produced is substantially insoluble, i.e., greater than 10% insoluble in a solvent defined hereinafter. Substantial insolubility indicates the presence of gel and/or dicyclopentadiene homopolymer. A method is desired of making a copolymer of cyclopentene with dicyclopentadiene that is greater than 90% soluble in a solvent defined hereinafter in order to simplify polymer compounding and polymer removal from polymerization vessels.

U.S. Pat. No. 3,778,420 teaches preparation of copolymers of a cyclic monoolefin and up to 50% by weight of a cyclic polyolefin. A new copolymer is desired having positive green strength.

SUMMARY OF THE INVENTION

Substantially gel-free copolymers of cyclopentene with dicyclopentadiene are prepared by polymerizing these monomers in the presence of (1) a catalyst comprising (a) at least one compound selected from the group consisting of dialkylaluminum iodides, alkylaluminum diiodides and mixtures of trialkylaluminum compounds with elemental iodine and (b) at least one solvent- or monomer-soluble tungsten compound, and (2) at least one nonconjugated acyclic olefin having at least one hydrogen on each double-bonded carbon atoms. Catalyst component (a) is charged before catalyst component (b). This improved process provides copolymers which are greater than 90% soluble in a solvent such as benzene, even when the copolymers contain greater than 90% dicyclopentadiene. Cyclopentene-dicyclopentadiene copolymer compositions wherein the copolymer contains from about 55 wt.% to about 98 wt.% dicyclopentadiene have excellent green strength.

DETAILED DESCRIPTION

Cyclopentene is copolymerized with dicyclopentadiene to form a linear, unsaturated polymer having repeating linkages primarily of the following types in random order, where $m$ and $n$ are numbers which are proportional to the concentrations of cyclopentene and dicyclopentadiene monomers used:

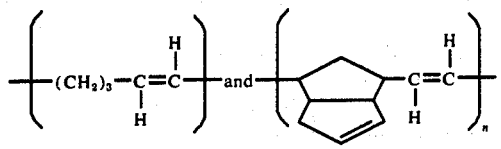

The alkylaluminum iodide compounds are selected from the group consisting of dialkylaluminum iodides and alkylaluminum diiodides wherein each alkyl group contains from 2 to 8 carbon atoms, more preferably from 2 to 4 carbon atoms, such as diethylaluminum iodide, ethylaluminum diiodide, propylaluminum diiodide, ethylpropylaluminum iodide, and the like. A mixture of a trialkylaluminum compound and iodine may also be used wherein each alkyl group contains from 2 to 8 carbon atoms, more preferably from 2 to 4 carbon atoms, such as a mixture of triethylaluminum and iodine and the like. Excellent results were obtained using diethylaluminum iodide. Surprisingly and unexpectedly, other organoaluminum and organoaluminum halide compounds have been found to be unsuitable in the present invention. Such other unsuitable compounds produce substantially insoluble copolymers, i.e., copolymers that are greater than 10% insoluble in a solvent defined hereinafter. Substantial insolubility indicates the presence of gel and/or dicyclopentadiene homopolymer. Such other unsuitable compounds include trialkylaluminum compounds used without iodine such as triethylaluminum and the like, and dialkylaluminum halides and alkylaluminum dihalides wherein the halogen is selected from the group consisting of fluorine, chlorine, and bromine, such as diethylaluminum chloride, ethylaluminum dichloride, diethylaluminum bromide, diethylaluminum fluoride, and the like.

The tungsten compounds used in the invention are soluble in the monomers or inert solvents used. Suitable inert solvents include aliphatic or cycloaliphatic hydrocarbon solvents containing 4 to 10 carbon atoms such as pentane, hexane, heptane, octane, cyclohexane, cyclooctane and the like; aromatic hydrocarbon solvents containing 6 to 14 carbon atoms and which are liquid or easily liquified such as benzene, toluene, naphthalene and the like; and substituted hydrocarbons wherein the substituents are inert, such as dichloromethane, chloroform, chlorobenzene and the like. Benzene was found to be an excellent solvent. Suitable tungsten compound include tungsten carbonyl $[W(CO)_6]$, tungsten oxytetrachloride, and the like. Also suitable and more preferred are tungsten halides which include chlorides, bromides, iodides and fluorides such as tungsten hexachloride, tungsten hexafluoride and the like. Excellent results were obtained using tungsten hexachloride.

The alkylaluminum iodide or alkylaluminum compound is employed at a level from about 0.15 to about 0.35 millimoles per mole of total cyclopentene and dicyclopentadiene. The alkylaluminum iodide or alkylaluminum compound is used in a catalytically effective molar ratio to tungsten compound from about 1 to about 40 moles per mole, more preferably from about 1 to about 10 moles per mole. The elemental iodine is used in a range from about 0.25 mole to about 6 moles of elemental iodine per mole of trialkylaluminum compound, more preferably from about 0.5 to about 3 moles per mole. The catalyst components may be charged directly or in solution, but the alkyl-aluminum iodide or mixture of trialkylaluminum and iodine must be charged before the tungsten compound.

At least one nonconjugated acyclic olefin is used having at least one hydrogen on each double-bonded carbon atom and containing 2 to 12 carbon atoms, more preferably 2 to 8 carbon atoms. Examples of suitable compounds include 1-olefins such as 1-butene, 3-methyl-1-butene, and the like; 2-olefins such as 2-pentene, 4-methyl-2-pentene and the like; 3-olefins such as 5-ethyl-3-octene and the like; nonconjugated diolefins such as 1,6-hexadiene and the like; nonconjugated triolefins such as 1,4,7-octatriene and the like; and like compounds. More preferably the nonconjugated acyclic olefin is selected from the group consisting of 1-olefins and 2-olefins containing 2 to 8 carbon atoms such as 1-butene, 3-methyl-1-butene, 2-pentene, 4-methyl-2-pentene and the like. Compounds not having at least one hydrogen atom on each double-bonded carbon are unreactive in this invention, and conjugated olefins such as butadiene, isoprene and the like are active inhibitors.

The nonconjugated acyclic olefin is used in a molar ratio to total cyclopentene and dicyclopentadiene from about 0.01 to about 0.3 mole per mole. The nonconjugated acyclic olefin may be charged directly or in solution at any point in the charge procedure, but it is more preferably charged along with the monomers. When charged last, the nonconjugated acyclic olefin preferably is charged before reaction begins.

A polymerization activator may be used but is not generally needed. Examples of activators include water, methanol, ethanol, isopropyl alcohol, benzyl alcohol, phenol, ethyl mercaptan, 2-chloroethanol, 1,3-dichloropropanol, p-bromophenol, epichlorohydrin, ethylene oxide, cyclopentene-2-hydroperoxide, cumyl hydroperoxide, tertiary butyl peroxide, benzoyl peroxide, and air or oxygen. Excellent activation is obtained by using air or a peroxide or hydroperoxide as the activator, especially by using the organic peroxides such as benzoyl peroxide. The activator may be employed in a range from about 0 moles to about 3 moles per mole of organoaluminum compound, more preferably from about 0 to about 1 mole per mole. The activator may be added at any point in the charge procedure, but it is more preferably added last, after the tungsten compound.

The polymerization may be performed as a batch or continuous process and in bulk or in solution. The polymerization is usually performed in a solvent or diluent defined heretofore and is therefore a solution polymerization. The solvent may be added at any point in the charge procedure, but it is more preferably charged before the catalyst.

The process is used effectively to prepare cyclopentene-dicyclopentadiene copolymers. Up to about 98% by weight of dicyclopentadiene may be copolymerized, based upon the total weight of copolymer. More preferably, the dicyclopentadiene is copolymerized in a range from about 35% to about 98% by weight, even more preferably from about 50% to about 98% by weight, based upon the total weight of copolymer. Minor amounts of other monomers such as norbornylene may also be copolymerized. Surprisingly and unexpectedly, cyclopentene-dicyclopentadiene copolymer compositions wherein the copolymer contains from about 55 wt.% to about 98 wt.% dicyclopentadiene, more preferably about 60 wt.% about 80 wt.% dicyclopentadiene, have excellent green strength.

The monomers may be added at any point in the charging procedure. Normally, the monomers, solvent, if used, and nonconjugated acyclic olefin are added first to the reactor vessel. These ingredients may be added separately or as a mixture of ingredients. The alkylaluminum iodide compound or mixture of trialkylaluminum compound and elemental iodine is added next, usually as a solution in a solvent such as benzene or the like. The tungsten compound is added, usually as a solution in a solvent such as benzene or the like, followed by the activator if used. The tungsten compound must be added after the alkylaluminum iodide compound or mixture of trialkylaluminum compound and elemental iodine.

Monomeric impurities such as water and the like should be removed prior to addition of the tungsten compound. The alkylaluminum iodide compound or mixture of trialkylaluminum compound and elemental iodine may be used to titrate the monomers or mixture of monomers and solvent until a color change from pink to colorless or slightly yellow is noted. A catalytically effective amount of akylaluminum iodide compound or a mixture of trialkylaluminum compound and elemental iodine may then be added, followed by addition of the tungsten compound. The end point of the titration is typically difficult to pinpoint exactly. With minor impurities present, up to ten times the catalytically effective amount and more of the alkylaluminum iodide or mixture of trialkylaluminum compound and iodine may be required to render the impurities harmless.

The mixing of catalyst components and the reaction are carried out in an inert atmosphere such as nitrogen and in the substantial absence of air or water. The reaction is conducted under sufficient pressure to keep the cyclopentene and dicyclopentadiene in liquid state, the pressure required depending upon the reaction temperature. Reaction temperature may be from about 100° C to about −60° C and lower, more preferably from about 35° C to about 0° C. The polymerization may be shortstopped by addition of alcohols, amines or carboxylic acids such as ethanol, t-butyl phenol, diethylamine, acetic acid and the like.

The polymers may be isolated by any method known to the art such as by direct dying under reduced pressure, by precipitation using an alcohol such as methanol, ethanol, isopropanol and the like, or by steam or hot water stripping. The polymer is recovered and may be washed further with water or alcohol and then dried.

The copolymers of this invention are high molecular weight products having an inherent viscosity from about 0.1 to about 10, more generally from about 0.5 to 5 and are greater than 90% soluble in a solvent defined heretofore. Substantial insolubility indicates the presence of gel and/or dicyclopentadiene homopolymer. By inherent viscosity ($v_{inh}$) is meant a value obtained by dividing the natural logarithm of relative viscosity ($v_r$ = ratio of solution viscosity to solvent viscosity) by the concentration (c) being measured in grams of polymer per 100 milliliters of solvent at a given temperature, in this case 0.1 gram in 100 milliliters of toluene at 25° C:

$$\eta_{inh} = \frac{\ln \eta_r}{c} = \frac{\ln(\eta/\eta_0)}{c}$$

The inherent viscosity is regarded as a measure of molecular weight and is reported in units of deciliters/gram.

The following examples illustrate the present invention more fully.

EXAMPLE 1 – 14

Cyclopentene was copolymerized with dicyclopentadiene by the following procedure. Glass reactor vessels were used. Each vessel was well-cleaned prior to the run with soap and water, rinsed with acetone, heated in an oven at 140° C and thereafter flushed with nitrogen. Cyclopentene and dicyclopentadiene were mixed with benzene and added to the reactor vessel. 1-Butene was added as a 2 volume percent solution in benzene when used. The alkylaluminum halide or trialkylaluminum compound (diethylaluminum iodide, diethylaluminum chloride, ethylaluminum dichloride, or triethylaluminum as 0.5, 0.5, 0.25 and 0.5 molar solutions in benzene, respectively) and tungsten hexachloride (0.05 molar solution in benzene) were added in varying order to the reactor vessel. The polymerizations were performed at about 22° C and produced little heat. Little agitation was required for efficient polymerization. The reactions were shortstopped by the addition of ethanol, and the polymers were precipitated and washed using ethanol. About 1 wt.% of di-t-butyl paracresol was added to the polymer as an antioxidant, and the polymer was dried in a vacuum oven at about 50° C. Percent yield was based upon the total weight of cyclopentene, dicyclopentadiene, and 1-butene charged. The grams and moles of reactants, yields, percentages of dicyclopentadiene in polymers, inherent viscosities (IV), and % insolubilities of the polymers are set forth in Tables I and II.

Example 1 demonstrates clearly the production of a highly soluble copolymer in good yield with proper reactants and conditions as described heretofore; 1--butene, diethylaluminum iodide and tungsten hexachloride are used with suitable Al/monomer and Al/W molar ratios, and the aluminum compound is added before the tungsten salt. Examples 2, 3, 4 and 5 demonstrate the production of no polymer or poorly soluble polymer with too high an Al/monomer molar ratio, too low an Al/monomer molar ratio, no 1-butene and improper aluminum compound addition order respectively, all using a diethylaluminum iodide and tungsten hexachloride catalyst system.

Examples 6, 7 and 8 employ diethylaluminum chloride, stated heretofore to be unsuitable, and demonstrate the production of no polymer or poorly soluble polymer with all other conditions and reactants proper as described heretofore used in Example 6, with too high an Al/monomer molar ratio in Example 7, and with improper aluminum compound addition order in Example 8. Examples 9, 10 and 11 employ ethylaluminum dichloride, stated heretofore to be unsuitable, and show the production of no polymer or poorly soluble polymer with all other conditions and reactants proper as described heretofore used in Example 9, with too high an Al/monomer molar ratio in Example 10, and with improper aluminum compound addition order in Example 11. Examples 12, 13, and 14 employ triethylaluminum, stated heretofore to be unsuitable, and show the production of no polymer or poorly soluble polymer with all other conditions and reactants proper as described heretofore used in Example 12, with too high an Al/monomer molar ratio in Example 13, and with improper aluminum compound addition order in Example 14.

TABLE I

| Example | 1 | 2 | 3 | 4 | 5 | 6 | 7 | 8 |
|---|---|---|---|---|---|---|---|---|
| Benzene, grams | 73.0 | 74.7 | 74.1 | 76.1 | 73.7 | 72.4 | 75.4 | 75.2 |
| moles | 0.93 | 0.96 | 0.95 | 0.97 | 0.94 | 0.93 | 0.97 | 0.96 |
| Cyclopentene, grams | 4.6 | 4.5 | 4.6 | 4.5 | 4.6 | 4.6 | 4.6 | 4.6 |
| moles | 0.07 | 0.07 | 0.07 | 0.07 | 0.07 | 0.07 | 0.07 | 0.07 |
| DCPD, grams | 5.9 | 5.7 | 5.9 | 5.8 | 5.9 | 5.8 | 5.8 | 5.8 |
| moles | 0.04 | 0.04 | 0.04 | 0.04 | 0.04 | 0.04 | 0.04 | 0.04 |
| 1-butene, grams | 0.85 | 0.9 | 0.9 | 0 | 0.85 | 0.9 | 0.9 | 0.9 |
| millimols | 15 | 16 | 16 | 0 | 15 | 16 | 16 | 16 |
| Et$_2$AlI, grams | 0.005 | 0.011 | 0.003 | 0.005 | 0.005 | 0 | 0 | 0 |
| millimoles | 0.025 | 0.05 | 0.012 | 0.025 | 0.025 | 0 | 0 | 0 |
| Et$_2$AlCl, grams | 0 | 0 | 0 | 0 | 0 | 0.003 | 0.006 | 0.003 |
| millimoles | 0 | 0 | 0 | 0 | 0 | 0.025 | 0.05 | 0.025 |
| WCl$_6$, grams | 0.008 | 0.008 | 0.008 | 0.008 | 0.008 | 0.008 | 0.008 | 0.008 |
| millimoles | 0.02 | 0.02 | 0.02 | 0.02 | 0.02 | 0.02 | 0.02 | 0.02 |
| Millimoles Al compound/mole monomer | 0.2 | 0.4 | 0.1 | 0.2 | 0.2 | 0.2 | 0.4 | 0.2 |
| Al/W molar ratio | 1.25 | 2.5 | 0.6 | 1.25 | 1.25 | 1.25 | 2.5 | 1.25 |
| Al or W compound added first | Al | Al | Al | Al | W | Al | Al | W |
| Time, hours | 1 | 1 | 0.6 | — | 1.75 | 1.75 | — | 1.75 |
| Polymer yield, grams | 6.2 | 5.9 | 0 | 7.1 | 6.4 | 0 | 6.3 | 4.8 |
| wt.% | 54 | 53 | 0 | 68 | 56 | 0 | 55 | 42 |
| Wt.% DCPD in polymer | 96 | — | — | 82 | 92 | — | 92 | — |
| IV | 0.92 | 1.38 | — | 1.68 | 0.86 | — | 1.18 | 1.16 |
| % Insoluble Polymer | 4.1 | 98 | — | 66 | 62 | — | 94.6 | 95.1 |

DCPD = dicyclopentadiene;
Et$_2$AlI = diethylaluminum iodide;
WCl$_6$ = tungsten hexachloride
Et$_2$AlCl = diethylaluminum chloride;

TABLE II

| EXAMPLE | 9 | 10 | 11 | 12 | 13 | 14 |
|---|---|---|---|---|---|---|
| Benzene, grams | 76.3 | 72.7 | 73.7 | 76.4 | 70.1 | 76.4 |
| moles | 0.98 | 0.93 | 0.94 | 0.98 | 0.90 | 0.98 |
| Cyclopentene, grams | 4.5 | 4.6 | 4.5 | 4.6 | 4.9 | 4.6 |
| moles | 0.07 | 0.07 | 0.07 | 0.07 | 0.07 | 0.07 |
| DCPD, grams | 5.9 | 5.8 | 5.9 | 5.7 | 5.8 | 5.8 |
| moles | 0.04 | 0.04 | 0.04 | 0.04 | 0.04 | 0.04 |
| 1-butene, grams | 0.9 | 0.85 | 0.8 | 0.9 | 0.9 | 0.9 |
| millimoles | 16 | 15 | 14 | 16 | 16 | 16 |
| $EtAlCl_2$ grams | 0.003 | 0.006 | 0.003 | 0 | 0 | 0 |
| millimoles | 0.025 | 0.05 | 0.025 | 0 | 0 | 0 |
| $Et_3Al$, grams | 0 | 0 | 0 | 0.003 | 0.006 | 0.003 |
| millimoles | 0 | 0 | 0 | 0.025 | 0.05 | 0.025 |
| $WCl_6$, grams | 0.008 | 0.008 | 0.008 | 0.008 | 0.008 | 0.008 |
| millimoles | 0.02 | 0.02 | 0.02 | 0.02 | 0.02 | 0.02 |
| Millimoles Al compound/ mole monomer | 0.2 | 0.4 | 0.2 | 0.2 | 0.4 | 0.2 |
| Al/W molar ratio | 1.25 | 2.5 | 1.25 | 1.25 | 2.5 | 1.25 |
| Al or W compound added first | Al | Al | W | Al | Al | W |
| Time, hours | 2 | — | — | 4.5 | 3.5 | 2 |
| Polymer yield, grams | 0 | 6.3 | 6.6 | 0 | 1.2 | 3.4 |
| Wt.% | 0 | 56 | 58 | 0 | 10 | 30 |
| Wt.% DCPD in polymer | — | 92 | 89 | — | 96* | 95* |
| IV | — | 0.36 | 1.2 | — | 0.88 | 0.95 |
| % Insoluble Polymer | — | 76 | 98 | — | 38 | 82 |

DCPD = dicyclopentadiene; $EtAlCl_2$ = ethylaluminum dichloride;
$Et_3Al$ = triethylaluminum; $WCl_6$ = tungsten hexachloride

*DCPD in polymer chain is addition polymerization units of the structure 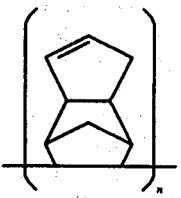

EXAMPLES 15 – 20

Cyclopentene was copolymerized with dicyclopentadiene by the same general procedure as in Examples 1 – 14, except that diethylaluminum bromide and diethylaluminum fluoride were each evaluated as catalysts as a 0.20 molar solution in benzene and a 0.7 molar solution in heptane respectively. In each case the alkylaluminum halide was added before the tungsten hexachloride. Examples 15 to 17 cover a range of Al/monomer and Al/W molar ratios where diethylaluminum bromide is used but do not produce less than 10% insoluble polymer as can be done with diethylaluminum iodide. Similarly, Examples 18 to 20 cover a range of Al/monomer and Al/W molar ratios where diethylaluminum fluoride is used but do not produce less than 10% insoluble polymer as can be done with diethylaluminum iodide. The grass and moles of reactants, yields, percentages of dicyclopentadiene in polymers, inherent viscosities (IV) and % insolubilities of the polymers are set forth in Table III.

TABLE III

| EXAMPLE | 15 | 16 | 17 | 18 | 19 | 20 |
|---|---|---|---|---|---|---|
| Benzene, grams | 74.5 | 75.9 | 72.4 | 74.1 | 71.9 | 74.9 |
| moles | 0.95 | 0.97 | 0.93 | 0.95 | 0.92 | 0.96 |
| Cyclopentene, grams | 4.5 | 4.6 | 4.6 | 4.5 | 4.6 | 4.6 |
| moles | 0.07 | 0.07 | 0.07 | 0.07 | 0.07 | 0.07 |
| DCPD, grams | 5.9 | 5.9 | 5.8 | 5.9 | 5.9 | 5.9 |
| moles | 0.04 | 0.04 | 0.04 | 0.04 | 0.04 | 0.04 |
| 1-butene, grams | 0.9 | 0.85 | 0.85 | 0.8 | 0.9 | 0.9 |
| millimoles | 16 | 15 | 15 | 15 | 16 | 16 |
| $Et_2AlBr$, grams | 0.004 | 0.008 | 0.016 | 0 | 0 | 0 |
| millimoles | 0.025 | 0.05 | 0.10 | 0 | 0 | 0 |
| $Et_2AlF$, grams | 0 | 0 | 0 | 0.003 | 0.005 | 0.010 |
| millimoles | 0 | 0 | 0 | 0.025 | 0.05 | 0.10 |
| $WCl_6$, grams | 0.008 | 0.008 | 0.008 | 0.008 | 0.008 | 0.008 |
| millimoles | 0.02 | 0.02 | 0.02 | 0.02 | 0.02 | 0.02 |
| Millimoles Al compound/ mole monomer | 0.2 | 0.4 | 0.8 | 0.2 | 0.4 | 0.8 |
| Al/W molar ratio | 1.25 | 2.5 | 5.0 | 1.25 | 2.5 | 5.0 |
| Al or W compound added first | Al | Al | Al | Al | Al | Al |
| Time, hours | — | 19 | 1 | 1.5 | — | 1.5 |
| Polymer, grams | 0 | 4.9 | 6.9 | 6.2 | 0 | 6.8 |
| Wt.% yield | 0 | 43 | 61 | 55 | 0 | 59 |
| Wt.% DCPD in polymer | — | >95 | >95 | >95 | — | >95 |
| IV | — | 0.61 | — | 0.51 | — | 0.54 |
| % Insoluble Polymer | — | 17 | 94 | 90 | — | 62 |

$Et_2AlBr$ = diethylaluminum bromide;
$Et_2AlF$ = diethylaluminum fluoride;
$WCl_6$ = tungsten hexachloride.

EXAMPLES 21 – 28

Cyclopentene-dicyclopentadiene copolymers with varying dicyclopentadiene contents were prepared following the general catalyst preparation and addition procedure of this invention as shown by Example 1. The copolymers made were admixed with compounding ingredients according to the recipes in Table IV and cured. Compounding was done using a two-roll mill operating at a roll temperature of about 40° C to about 90° C. Materials prepared other than by the process of this invention were unsatisfactory because they were very difficult or impossible to compound.

Physical testing of the copolymers was performed, and the results are set forth in Table V. 300% modulus, tensile strength and ultimate elongation were determined according to ASTM D412-68 using Die D dumbbells. Compression fatigue ($\Delta T$, °F) was tested according to ASTM D623-67 at 212° F using a Goodrich flexometer with a 0.175 inch stroke, 55 lb. static load (143 lb/in.$^2$), 20 minute conditioning time and 25 minute running time. Durometer hardness was measured according to D2240-68 using a Shore Type A durometer and a one second indentation hardness time interval. Low-temperature stiffening was determined according to ASTM D1053-65 using a color code yellow torsion wire in a nitrogen heat transfer medium, with twist measured after a 10-second exposure interval. Values reported for the stiffening test include $T_2$, $T_5$, $T_{10}$ and $T_{100}$ values. "Hot tear" strength was determined according to the procedure described by Vieth, *Rubber Chemistry and Technology*, Vol. 38, No. 4, November 1965, pp. 700–718. Pico abrasion resistance was measured according to ASTM D2228-69 using a 4.5 kg weight, a 60 rpm speed and 240 revolutions. Abrasion index was calculated according to Sect. 11.3 of the latter procedure.

The physical testing data indicates that the polymers tested have a good balance of physical properties that make them suitable for tire rubber applications. The outstanding property is high tensile strength at high temperatures and is particularly important in truck tire rubbers, since truck tires run "hotter" under a heavier load than other tires.

TABLE IV

| EXAMPLE | 21 | 22 | 23 | 24 | 25 | 26 | 27 | 28 |
|---|---|---|---|---|---|---|---|---|
| Copolymer | 100 | 100 | 100 | 100 | 100 | 100 | 100 | 100 |
| Carbon Black, HAF, N330 | 75 | 75 | 75 | 75 | 75 | 75 | 60 | 75 |
| Naphthenic Oil | 50 | 50 | 50 | 50 | 50 | 50 | 26 | 50 |
| Stearic Acid | 3 | 3 | 5 | 5 | 3 | 3 | 3 | 5 |
| Zinc Oxide | 3 | 3 | 5 | 5 | 3 | 3 | 3 | 5 |
| Sulfur | 2.5 | 2.5 | 1.3 | 1.3 | 2.5 | 2.5 | 2.5 | 1.3 |
| N-cyclohexyl-2-benzothiazole sulfenamide | 1 | 1 | 1.3 | 1.3 | 1 | 1 | 1 | 1.3 |

TABLE V

| EXAMPLE | 21 | 22 | 23 | 24 | 25 | 26 | 27 | 28 |
|---|---|---|---|---|---|---|---|---|
| Wt.% Dicyclopentadiene | 28 | 35 | 42 | 52 | 56 | 65 | 68 | 92 |
| IV | 3.5 | 2.5 | 2.5 | 1.7 | 1.7 | 1.5 | 1.0 | 2.9 |
| Cure Time at 160° C, minutes | 33 | 22 | 20 | 20 | 41 | 60 | 20 | 35 |
| 300% modulus at 25° C, psig | 1900 | 1850 | 1420 | 1345 | 2500 | 3200 | 1975 | 3440 |
| 300% modulus at 100° C, psig | — | 1360 | 1240 | 900 | — | — | 740 | 1615 |
| Tensile at 25° C, psig | 2450 | 3000 | 3800 | 3215 | 3400 | 3200 | 2290 | 3860 |
| Tensile at 100° C, psig | 1040 | 1560 | 1920 | 1540 | 1260 | 1280 | 740 | 2150 |
| Ultimate Elongation at 25° C, % | 350 | 400 | 545 | 565 | 375 | 305 | 345 | 315 |
| Ultimate Elongation at 100° C, % | 250 | 330 | 400 | 440 | 255 | 230 | 300 | 340 |
| Compression Fatigue ($\Delta T$, °F) | 34 | 40 | 63 | 86 | 52 | 47 | ** | 63 |
| Durometer Hardness, Type | 62 | 63 | 65 | 66 | 65 | 74 | 82 | 80 |
| Low Temp. Stiffening, $T_2$, °F | −51 | −42 | −39* | −29* | −6 | −5 | +10* | −10* |
| Low Temp. Stiffening, $T_5$, °F | −57 | −47 | −41* | −31* | −30 | −19 | −9* | −15* |
| Low Temp. Stiffening, $T_{10}$, °F | −59 | −49 | −43* | −32* | −32 | −22 | −12* | −16* |
| Low Temp. Stiffening, $T_{100}$, °F | −64 | −55 | −48* | −37* | −38 | −30 | −20* | −23* |
| Hot Tear Strength at 100 °C, lbs/in. | — | — | 63 | 120 | — | — | 105 | 67 |
| Pico Abrasion Index | — | — | 95 | 89 | — | — | 98 | 122 |

*Low Temperature stiffening measured using uncured mixture of rubber and oil.
**Blow out, i.e., sample shattered.

EXAMPLES 29 – 35

Cyclopentene-dicyclopentadiene copolymers with varying dicyclopentadiene contents were prepared following the general catalyst preparation and addition procedure of this invention as shown by Example 1. 100 parts by weight of each copolymer was mixed with about 25 parts by weight of paraffinic petroleum oil having a $T_g$ of about −90° C. Each copolymer-oil mixture was placed in a Teflonlined pan and swelled using benzene in an amount about 5 to 10 times the total copolymer-oil weight. The benzene was allowed to evaporate at room temperature.

The copolymer-oil compositions were tested for green strength using an Instron model TM tensile tester. Samples were prepared for testing by pressing into 3 × 6 × 0.075 in. sheets. Pressing was done for about 10 minutes at about 250° F using 25,000 lbs./in.$^2$ of pressure applied to a 4-in. ram. The pressed samples were cut into 1 × 6 × 0.075 in. sections and pulled on the Instron machine at 25° C at a rate of 20 inches/minute. Test data is set forth in Table VI.

TABLE VI

| EXAMPLE | Wt.% Dicyclopentadiene in Copolymer | Green Strength (Lbs./in.²) |
| --- | --- | --- |
| 29 | 0 | −37 |
| 30 | 5 | −26 |
| 31 | 35 | 0 |
| 32 | 52 | 0 |
| 33 | 64 | 3 |
| 34 | 70 | 16 |
| 35 | 76 | 40 |

The data in Table VI demonstrates development of positive green strength in compositions where the cyclopentene-dicyclopentadiene copolymer contains about 55 wt.% or more of dicyclopentadiene. Green strength is calculated by subtracting yield force from breaking force. Positive green strength signifies that the copolymer will have the necessary cohesive strength for easy handling during compounding.

The copolymers of this invention are vulcanized readily to high tensile strength (at 25° C and 100° C) rubbers suitable for use in tires, particularly in truck tires, as well as in other rubber goods. Some cyclopentene-dicyclopentadiene copolymers not compounded with oil have plastic properties. A vulcanizing agent such as elemental sulfur or a thiuram di- or polysulfide and a broad range of accelerators and other compounding ingredients known to the art may be used together with the polymers produced by the process of this invention.

I claim:
1. A copolymer comprising cyclopentene, dicyclopentadiene and from about 0.01 to about 0.3 mole of at least one nonconjugated acyclic olefin polymerized therewith per mole of total cyclopentene and dicyclopentadiene monomer, said nonconjugated acyclic olefin having at least one hydrogen on each double-bonded carbon atom and 2 to 12 carbon atoms, and said dicyclopentadiene being present in an amount from about 55% to about 98% by weight of the total weight of copolymer.
2. A copolymer of claim 1 wherein dicyclopentadiene is present in an amount from about 60% to about 80% by weight of the total weight of copolymer.
3. A copolymer of claim 2 wherein said nonconjugated acyclic olefin is a 1-olefin or 2-olefin containing from 2 to 8 carbon atoms.
4. A copolymer of claim 3 wherein said 1-olefin is 1-butene.

* * * * *

UNITED STATES PATENT OFFICE
CERTIFICATE OF CORRECTION

PATENT NO. : 4,002,815
DATED : January 11, 1977
INVENTOR(S) : Robert J. Minchak

It is certified that error appears in the above-identified patent and that said Letters Patent are hereby corrected as shown below:

Column 2, line 10 delete the formula and insert ---

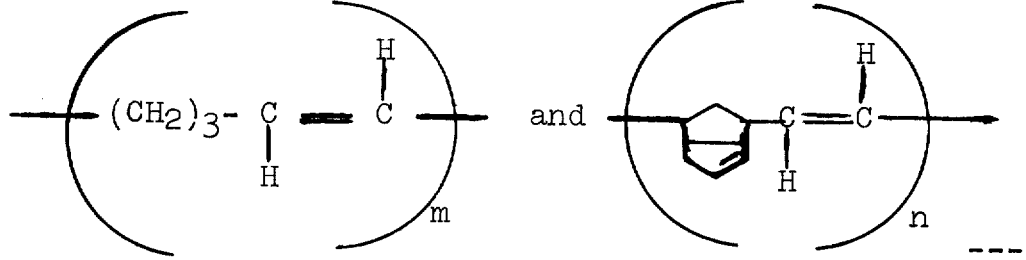

---

Column 4, line 55 delete the word "dying" and insert ---drying---.

Column 4, line 66 delete "($v_{inh}$)" and insert ---($n_{inh}$)---.

Column 4, line 68 delete "($v_r$" and insert ---($n_r$---.

Signed and Sealed this

Twenty-sixth Day of April 1977

[SEAL]

Attest:

RUTH C. MASON
Attesting Officer

C. MARSHALL DANN
Commissioner of Patents and Trademarks